Jan. 27, 1931.  A. J. ROTHMAN  1,789,987
COMBINED IRONING MACHINE AND UTILITY TABLE
Filed March 28, 1928   3 Sheets-Sheet 1
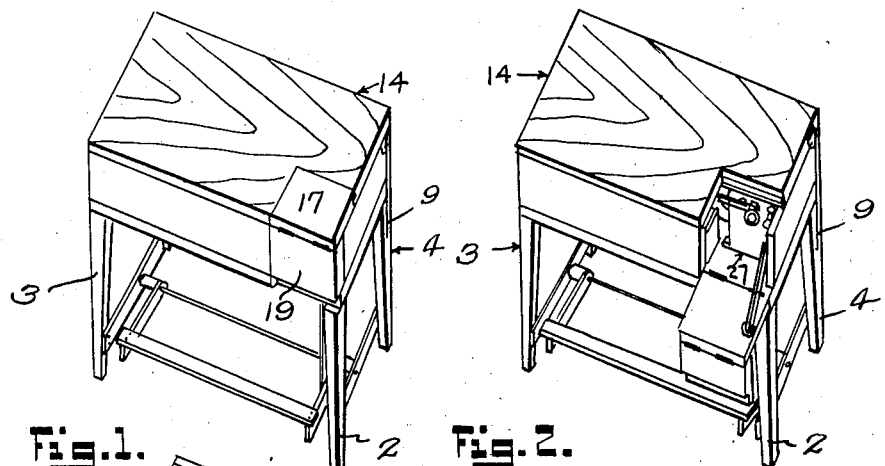
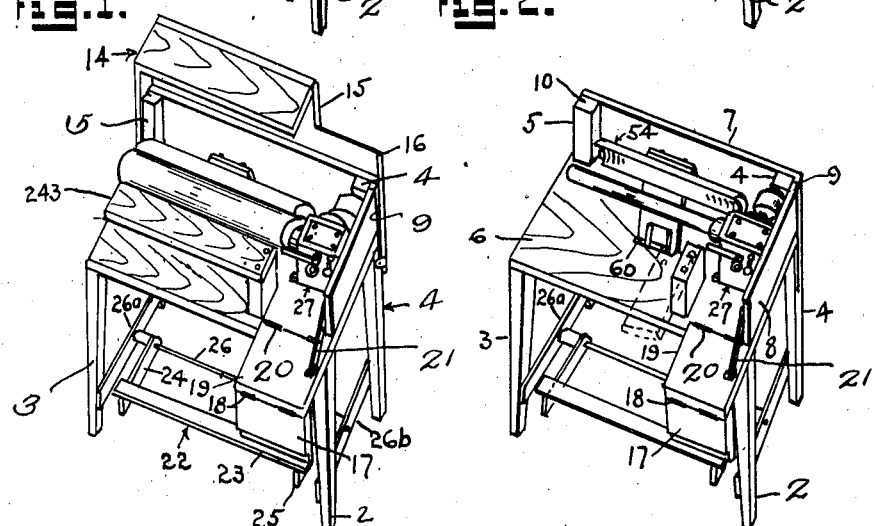
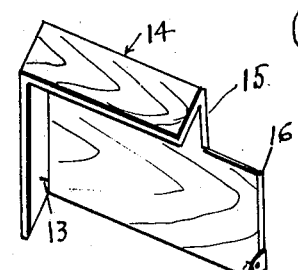
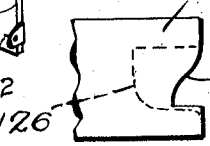
Abraham Jacob Rothman
INVENTOR.
BY Charles Allock
ATTORNEY.

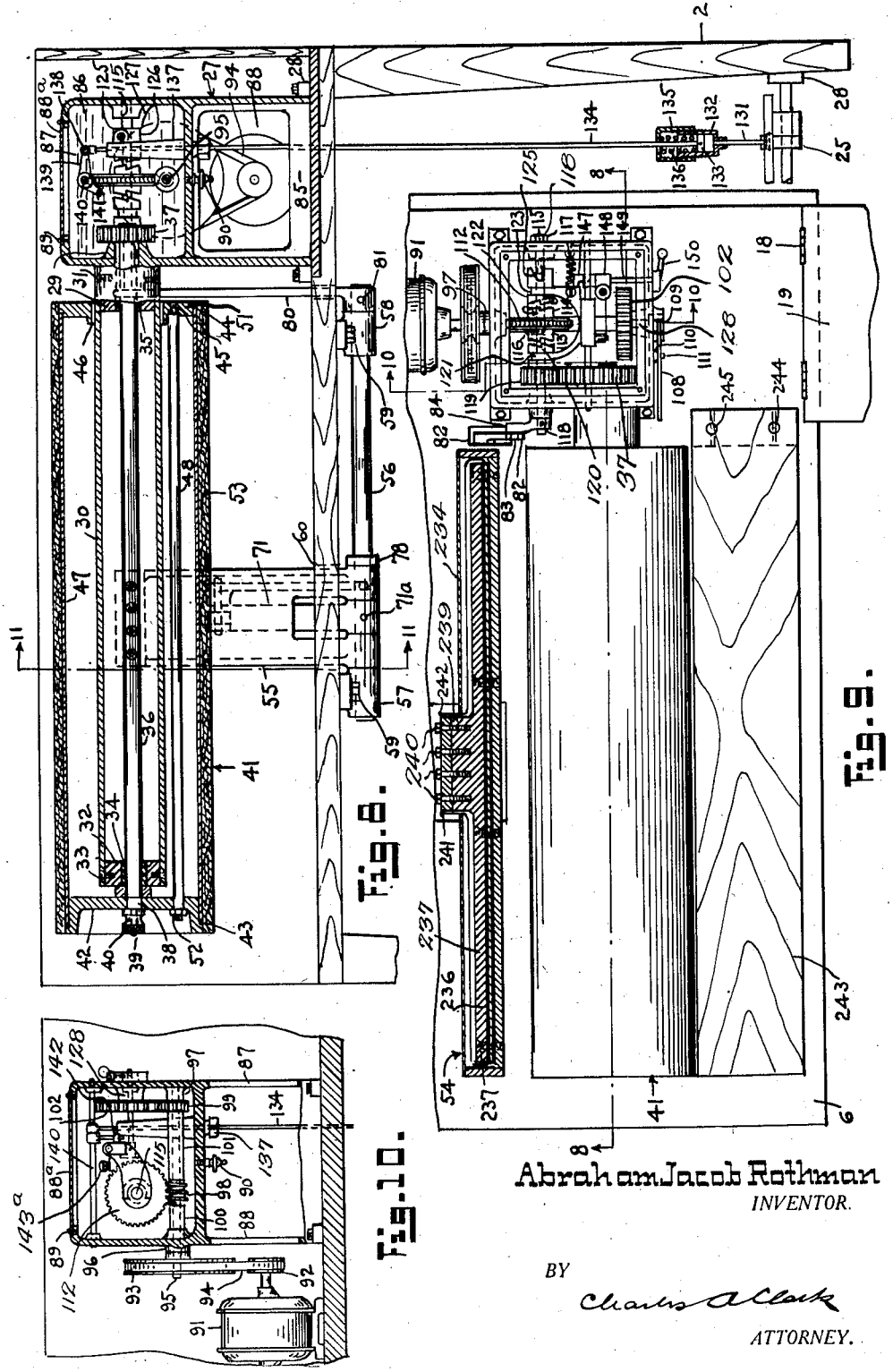

Jan. 27, 1931.  A. J. ROTHMAN  1,789,987

COMBINED IRONING MACHINE AND UTILITY TABLE

Filed March 28, 1928   3 Sheets-Sheet 3

Abraham Jacob Rothman
INVENTOR.

BY
Charles A. Clark
ATTORNEY.

Patented Jan. 27, 1931

1,789,987

UNITED STATES PATENT OFFICE

ABRAHAM JACOB ROTHMAN, OF NEW YORK, N. Y.

COMBINED IRONING MACHINE AND UTILITY TABLE

Application filed March 28, 1928. Serial No. 265,323.

My invention relates to ironing machines and refers more particularly to a combined power driven ironing machine, a kitchen and utility table and means arranged to be driven by the power device of the machine for operating various kitchen utensils.

One object of my invention is to provide an ironing machine of few moving parts, which is cheap to manufacture, efficient in operation, easily kept clean and highly utilitarian in use for its intended purpose.

Another object of my invention is to provide an ironing machine that is adapted not only to iron various garments but also to press garments as well.

A further object of my invention is to provide such an ironing machine to which may be attached and from which may be independently operated, such accessories to kitchen work as a juice extractor, food chopper, coffee grinder, beaters and whips.

A still further object of my invention is to provide such an ironing machine to which may be attached a flexible shaft adapted to be operably clamped in various positions to hold brushes, etc., for cleaning purposes.

One valuable feature of my invention consists of the arrangement of the combination wherein when it is desired to utilize the aforesaid attachments, only one corner or portion of the table need to be opened up to use the same.

Another valuable feature of my invention consists in the peculiar construction of the table which when opened up for ironing provides a shelf or feeder board to hold the work without interfering with the operation of the machine.

Still another valuable feature of my invention consists in the means provided for disassembling the major portion of the device to facilitate in the cleaning of the same.

A further valuable feature of my invention consists in the arrangement of the operative mechanism which permits the movement of the presser shoe only when the device is used as a presser for garments.

With these and other objects in view, my invention consists of the novel construction, arrangement and formation of parts, the particular utility and application of the device and the novel method of operating the same, hereinafter referred to substantially as illustrated, described and claimed in these specifications.

Referring to the drawings in which similar parts will be given the same reference numerals in the various figures:

Figure 1 is an isometric view of the device in a closed position wherein it may be utilized as a kitchen table.

Figure 2 is an isometric view of the device partly opened up so that attachments such as shown in Figures 14 to 22 inclusive could be used.

Figure 3 is an isometric view of the device opened up ready for use as an ironer, presser or utility device.

Figure 4 is an isometric view of the device with the roller, shelf and cover removed.

Figure 5 is an isometric view of the cover.

Figure 6 is an isometric view of the roller.

Figure 7 is an isometric view of the feeder board.

Figure 8 is a partial elevation and longitudinal section of the device taken on lines 8—8 of Figure 9.

Figure 9 is a plan partly in section of the device of Figure 11.

Figure 10 is a cross section of Figure 9, taken on lines 10—10 of Figure 9.

Fig. 23 is an enlarged detail view of the notched clutch jaw.

Figure 11:
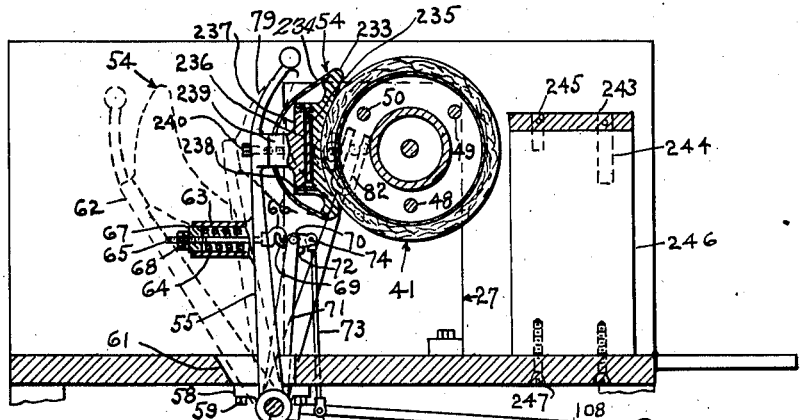
Figure 11 is a section of Figure 8, taken on line 11—11 of Figure 8.

The device includes a table having the front legs 2 and 3, the rear legs 4 and 5, and the top 6. As shown in Figs. 3 and 4 the rear legs 4 and 5 extend upon the table top and support the fixed back-board 7 and the fixed side-board 8. The two rear legs 4 and 5 are provided on their sides with the vertical grooves 9 and 10 in which the pins 12 and 13 and the cover 14 (Fig. 5) slide. By means of this arrangement the cover may be moved to either of two positions, that is closed position as shown in Figs. 1 and 2, and open position as shown in Fig. 3.

The right hand forward corner of the cover is cut away as at 15 with one edge provided with the groove 16 which fits into a similar groove on the top edge of the piece 17. This piece 17 is connected by hinges 18 to another piece 19 which in turn is connected by hinges 20 to the table top. These parts are held, when in open position, as shown in Fig. 3 at the folding support 21, so that the part 19 is substantially in the plane of the table top and the part 17 hangs downwardly as shown. When the cover is closed as shown in Fig. 1, parts 18 and 19 close the opening in the cover. When these parts are open, as shown in Fig. 2 certain parts of the mechanism will be exposed, as will be described in detail later.

The table also carries a treadle 22, comprised of a foot bar 23, two arms 24 and 25, supported by the rod 26, and two end pieces 26a and 26b secured to the legs which serve to hold the rod 26.

Upon this table is rigidly held a casing 27, by means of the feet 28, which casing is provided with a boss 29, upon which is shrunk a tube 30, which may be further secured with a pin or as shown in Figure 8, by the screws 31.

The tube 30 extends a distance from the casing 27 and is closed at its outer end by the central bore disc 32 held in place by means of the screws 33. An oilless bushing 34 is fixed in this disc and similarly in the boss 29 is fixed an oilless bearing bushing 35. These bearings carry a shaft 36 with the spur gear 37 on the end thereof, and lying within casing 27. The other end of shaft 36 is squared as at 38 and has a reduced threaded portion 39 to receive the knurled nut 40. The squared end of shaft 36 supports the roller unit 41 by engagement with the spider 42 which is provided with a shoulder 43 similar to the shoulder 44 on spider 45 to make a complete unit. The spider 45 is provided with the oilless bearing bushing 46.

The spiders 42 and 45, hold between them a tube 47, by means of the bolts 48, 49 and 50 (Fig. 11) each provided with a threaded part 51, engaging with the spider 45 and the other end passing through the spider 42 is provided with a nut 52.

These rods and their nuts firmly hold the tube 47, between the spiders 42 and 45, and upon this tube is mounted layers of cloth 53, in any suitable manner to act as cushions in ironing and pressing.

It is obvious that the spider 45, of the roll unit 41, may be revolved freely upon the tube 30, by the squared shaft 36, engaging with the spider 42, and that by removing the hand nut 40, the whole unit may be removed from the device for cleaning and repairing.

The table 6, also supports an electrically heated shoe unit 54, by means of a bracket 55, freely mounted on the shaft 56, carried in the bearings 57 and 58, which are bolted to the table 6, by the bolts 59. The table is provided with a hole 60, to allow for the passage of said arm and also to provide a stop 61, when the shoe unit 54 is released to the position 62, clearly shown by the dotted lines in Figure 11.

Integral with the bracket 55 is a tubular shaped boss 63, carrying a spring 64, which holds the bolt 65, with its hook end 66, and sliding washer 67, under an adjustable spring pressure by means of the nut 68.

This hook 66, engages with a hook 69, pivoted at 70, in the arm 71, provided with a stop 72. The hook 69 is extended to carry a rod 73 that is pivoted at 74, and also pivotally connected at 75, to a handle 76, with the knob 77, said handle being freely supported on the shaft 56, in the casting 78.

It is obvious that the hook 69, in the lever 71 which is fixed to the shaft 56, by the pin 71a, may engage with the hook 66, connected to the bracket 55, by an adjustable spring pressure means so that when the arm 71, is moved, it will move the bracket 55 and shoe unit 54, until the shoe unit comes in contact with the roll 41, and upon a continuation of this movement will place the shoe under a predetermined spring pressure upon the roll.

Whenever it is desired to carry the shoe element further back than the normal movement of the bracket 55, as shown by the dotted lines 79, in Figure 11, the arm 71, may be released by disengaging the hooks 66 and 69, which will allow the shoe unit to drop back into the position shown by the dotted lines 62, in Figure 11 by lifting the handle 76.

The other end of the shaft 56 has a lever 80, pinned thereto by the pin 81, which passes through a hole 85' in the table 6 and which is provided at its extreme end with a fork 82, which engages with a pin 83, in the crank 84.

The casing 27 is divided into two parts 85 and 86, the part 85, provided with holes 87 and 88 (Fig. 10) and the part 86, filled with oil 87, having a cover 88a, held thereon by the screws 89, and a drain cock 90, in the bottom.

The upper part 86 of the casing carries the mechanism for operating the device which is driven by the motor 91, having a pulley 92, driving a pulley 93, by the belt 94, said pulley 93, being fixed to the main shaft 95, supported in the bosses 96 and 97, in the said casing. This shaft carries a worm 98, and a gear 99, held in spaced relation to each other by the sleeves 100 and 101.

The gear 99, meshes with a gear 102, supported in a boss 103 (Fig. 14) in the said casing, enlarged at 104, to hold the unit end 105, of various attachments, such as illustrated in Figures 14, 15, 16 and 20. To hold this device positioned, a pin 106, forked at 107, is connected to a lever 108, by the pin 109. This lever is pivoted in the boss 100 at the pivot 111 (Fig. 9).

The worm 98, meshes with a worm wheel 112, which has two clutch jaws 113 and 114, and is freely and rotatably held upon the shaft 115, by the shouldered screw 116.

The shaft 115 has the collar 117 pinned thereto by the pin 118a and the crank 84 pinned thereto by the pin 118, and carries freely upon it to the left of the worm gear 112, a gear 119, provided with a clutch jaw 120, and a fork shifter groove 121.

Figures 12, 13, 14:
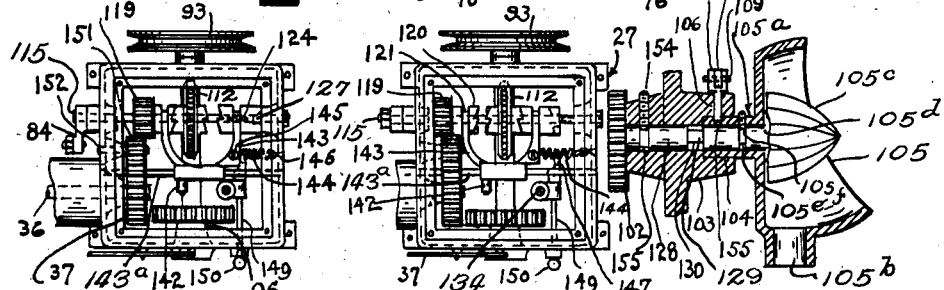
Figure 12 is a partial plan of the device illustrating the mechanism wherein the shoe is against the roll and the roll is revolving.
Figure 13 is a partial plan of the device illustrating the mechanism, after the treadle has been operated and when the shoe is half way over.
Figure 14 is a cross section of a juice extractor adapted to be attached to the device.

On the other side of the worm gear 112 is a clutch jaw 122, with a shifter groove 123, and the key 124, in shaft 115, shown in Figure 12, slidably engages with a groove in the clutch jaw 122, this clutch jaw having a small notch 125, and a large notch 126, engageable with the boss 127, see Fig. 23.

When the clutches are in the neutral position as shown in Figs. 8 and 9 the boss 127, is in the small notch 125 and the shaft 115 will not move. The shoe is away from the roll, the shaft 95, will operate the shaft 128, carrying the gear 102 and drive the shaft 128, which is provided with a flattened end 129 (Fig. 14) to fit the slot 130, of the attachments, see Figure 14.

When the treadle 22, is pressed down, the rod 131, carrying the cup 132, into which fits the sliding piece 133, fast to the rod 134, said cup 132, having a cap 135, screwed thereon, for adjusting the tension of the spring 136, will pull the rod 134, down under the tension of the spring 136.

The rod 134, passing through the boss 137, in the casing 27, is connected by the pivot 138, to the bell crank 139, mounted on the shaft 140, the end 141, of the said bell crank engaging with a roller 142, rotatably held to the shifter fork 143 which is slidably mounted on rod 143a. This shifter fork is normally held against the said bell crank by the spring 144, held thereto by the screw 145.

To provide a means for utilizing the machine as a presser, as shown in Figures 9 and 11, so that the roll cannot be operated by means of the treadle, the cam 147, mounted in the boss 148, which is part of the boss 137, fixed to a shaft 149, passing through the case and connected to a lever 150, is provided so that by moving the lever down, as shown in Figures 9 and 11 where the shoe is against the roll, the cam will prevent the large notch of the clutch from entering all the way and by moving the lever up, the clutch may operate to the full depth of the large notch which will operate the roll.

The gear 119, meshes with the idler 151, on shaft 152, which gear meshes with the gear 37, on the shaft 36, so that when the mechanism is in the position shown in Figure 12, the shoe will be pressing against the roll and the roll revolving.

It is obvious that whenever the treadle is pushed down, the mechanism will move in the position shown in Figure 13, and stay there until the crank 84, has moved half way around whereupon the large notch 126, will engage with the boss 127, and the spring 144, will move the clutch in the position shown in Figure 12.

Figures 15, 16, 20, 21:
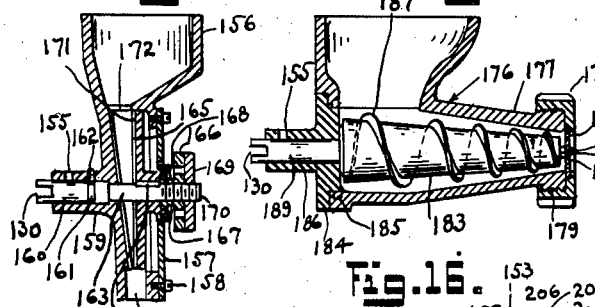
Figure 15 is a cross section of a coffee mill adapted to be attached to the device.
Figure 16 is a longitudinal section of a food chopper adapted to be attached to the device.
Figure 20 is an elevation, partly in section, of the flexible shaft.
Figure 21 is a section of the clutch fitting into one end of the flexible shaft and adapted to hold brushes etc., supplied with handles as shown in Figure 22.

The coffee grinder in Figure 15, food chopper in Figure 16, and flexible shaft end 153, in Figure 20, all have the slots 130, engageable with the end 129, of the shaft 128, which shaft is rotatably held within the boss 103, by the set screw 154, engaging with the groove 155.

The coffee grinder attachment is comprised of a casing 156, with a cover 157, held thereon by the screws 158, said casing having a boss 159, carrying a shaft 160, with a slot 130, and groove 161, adapted to rotatably position the shaft by means of the shouldered screw 162. Shaft 160 is reduced in diameter at 163, threaded at 170, and carries a key 164, which engages with a disc 165, said disc being adjustable in and out by means of the adjusting nut 166, and lock nut 169.

This disc 165 is connected to the adjusting nut by means of a split plate 167, which is held to the disc by the screws 168, and the screws set up through the holes 174.

The casing 156, has a corrugated inclined surface 172, and the disc a corrugated surface 171 between which the coffee grounds are reduced to powder, leaving the mill through the opening 175.

The food chopper is comprised of a casing 176, tapered at 177, with a cap 178, screwed to the casing at 179, and holding a plate 180, with perforations 181, and a bearing hole 182, carrying a tapered food feeding worm 183 at one end. The other end 189 of the worm is in the bearing 184, which has a bayonet attaching means 185, and a boss 186, provided with a hole 155, said hole provided to engage with the pin 106 in the boss 103. The pin 106 is forked at 107 which fork holds the lever 108 by means of the pin 109 in the boss 110 and the lever is pivoted at 111 in the boss 110 and this lever may be held by a spring, not shown, if desired in the position shown in Figure 14. The juice extractor shown in Figure 14 is comprised of a casing 105 with a boss 105a and a hole 105b and within this boss 105a is a cone shaped extractor element 105c which has a shaft extension 105d with a groove 105e into which fits the retaining screw 105f. The accessories, shown in Figures 14, 15, 16 and 20 all have a hole 155 which is engageable by the pin 106 to hold accessories within the boss 103 and the slots 130, shown in Figures 14, 15, 16 and 20 are all alike and adapted to engage with flattened end 129 in shaft 128.

The tapered feeding worm 183, is provided with gradually reducing screw flanges 187, an extension 188, fitting into the hole 182, and a shaft 189, slotted at 130.

It is obvious that the coffee mill and food chopper can be easily taken apart and assembled and all of the parts of the chopper can be taken apart almost instantly.

Figures 17, 18:
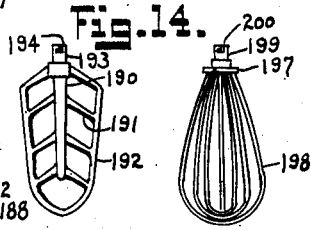
Figure 17 is an elevation of a beater.
Figure 18 is an elevation of a whip.

The beater shown in Figure 17, is comprised of a stem 190, with arms 191, connected to an outside piece 192, and a boss 193, provided with a bayonet connection 194, adapted to fit into and be held by one end 195, of the flexible shaft 196.

The whip shown in Figure 18, is comprised of a plate 197, into which the wires 198, are held, said plate terminating in a boss 199, with a bayonet connection 200, which also is adapted to fit into and be held by the flexible shaft 196.

The flexible shaft 196 is connected at one end to the other stub shaft 203 by means of a pin 202. The outer end of this stub shaft is slotted as at 130. Stub shaft 203 carries a sleeve 204 having the hole 155 to be engaged with the pin 106 (Fig. 14). The stub shaft 203 is revolvably held in the sleeve by means of the groove 207 and the screw stud 206.

On the other end shaft 196 is pinned to the shaft part 208a, by the pin 209, said part being provided with a cup 210, having a pin 211, engageable with the bayonet connection 212 of the chuck 213, see Figure 21, said chuck comprised of a cup shaped part 214, with a spring 215, carrying a pin 216, and held to the cup piece by the rivet 217. The shaft part 218, fits within the cup 210, and the pin 216 and cup 214, engages with a hole 219 in the handle 220, that may hold brushes, etc., not shown, by means of wires 221.

Figures 19, 22:
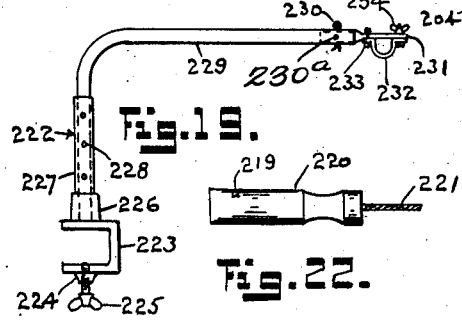
Figure 19 is an elevation of an adjustable tube.
Figure 22 is a plan of a handle, to which brushes, etc. may be fixed and adapted to be held by the chuck shown in Figure 21.

The end sleeve 212, of the flexible shaft 196, is held in various positions by means of the adjustable clamping device 222, shown in Figure 19.

The clamp 222, is comprised of a U shaped base 223, having a boss 224, holding a set screw 225, and a boss 226, holding a tube 227 with holes 228 into which tube slidably fits the bent arm 229, the end of which holds by means of the pin 230, an extension 231, with a U shaped clip 232, loosely held by the rivet 233, and clamped by the bolt and nut 234.

It is obvious that the arm 229, may be raised to various heights and held positioned by means of a pin in the hole 228, and that the part 231, may be turned in various positions and held by means of the pin 230 in the holes 230a.

The shoe 54 is comprised of a casting 233, with a sheet metal cover 234, and a pocket 235, containing an electric heating element 236, which heating element is clamped to the part 233, by the pressure plate 237, and screws 238, said pressure plate having a boss 239, which carries the arm 55, by means of the bolts 240. The wires 241 and 242 to this heating element may be carried to any suitable place on the machine, see Figures 9 and 11.

It is preferable to connect the heating element and motor in series with each other, to a switch and a plug socket, not shown, said plug and switch mounted in any suitable place upon the machine, said element and motor individually controlled but they can of course be individually connected and controlled.

In the front part of the device, a shelf 243, is provided, pivoted at 244, and having a positioning pin 245, which shelf is supported by means of the part 246, and screws 247.

It is obvious that this shelf may be swung into different positions one of which is indicated by the dotted lines 248 or it may be removed as indicated by Figure 4.

Having thus described and illustrated the preferred embodiment of my invention, I do not wish to limit myself to the exact constuction or arrangement of parts, since it is evident that modifications may be made therein without departing from the spirit of the invention or scope of the claims.

I claim:—

1. In a combined utility device of the type described the combination comprising a supporting member, a box-like cover for said member movable to open or closed position, said cover in closed position providing a table top, an ironing machine on said supporting member, power means connectable thereto for driving said ironing machine, said ironing machine and power means lying entirely within said cover when closed, means connected to said power means and having means to be coupled to utility devices to be operated and means forming part of said cover movable independently of the rest of the cover member to open position to expose for use said means connected to said power means.

2. In a combined utility device of the type described the combination comprising a supporting structure, a power operated device on said structure, a motor on said structure, a clutch for connecting the power operated device to the motor, means for operating said clutch, a cover for said power operated device movable into open and closed position, and coupling means driven by said motor to which utility appliances may be coupled and mounted so as to be within said cover when closed, a part of said cover being movable to expose said coupling means.

Signed at New York, in the county and State of New York, this 20 day of March, 1928.

ABRAHAM JACOB ROTHMAN.